United States Patent
Fuglsang et al.

(10) Patent No.: US 6,729,258 B1
(45) Date of Patent: May 4, 2004

(54) MARINE VESSEL FOR PASSENGERS, VEHICULAR TRAFFIC OR FREIGHT

(76) Inventors: John Theodore Fuglsang, 27 Salamanca Square, Battery Point, Tasmania 7004 (AU); Stephen Geoffrey Quigley, 11 Phillips Road, Kogarah, NSW 2217 (AU)

( * ) Notice: Subject to any disclaimer, the term of this patent is extended or adjusted under 35 U.S.C. 154(b) by 0 days.

(21) Appl. No.: 09/762,275
(22) PCT Filed: Aug. 4, 1999
(86) PCT No.: PCT/AU99/00628
§ 371 (c)(1), (2), (4) Date: Feb. 21, 2001
(87) PCT Pub. No.: WO00/07874
PCT Pub. Date: Feb. 17, 2000

(30) Foreign Application Priority Data
Aug. 4, 1998 (AU) .............................................. PP5025

(51) Int. Cl.[7] .................................................. B63B 1/00
(52) U.S. Cl. ....................................... 114/61.1; 114/274
(58) Field of Search .......................... 114/39.21, 39.26, 114/39.24, 39.27, 39.28, 61.1, 61.15, 61.2, 61.21, 274, 291

(56) References Cited

U.S. PATENT DOCUMENTS

| | | | | |
|---|---|---|---|---|
| 2,375,973 A | * | 5/1945 | Cooper et al. ............... | 114/292 |
| 3,995,575 A | * | 12/1976 | Jones, Jr. ..................... | 114/280 |
| 4,348,972 A | * | 9/1982 | Parsons ........................ | 114/61 |
| 4,582,011 A | * | 4/1986 | Logan .......................... | 114/39 |
| 4,907,518 A | | 3/1990 | Tunis, III | |
| 4,915,048 A | | 4/1990 | Stanford | |
| 5,191,853 A | | 3/1993 | Adler | |
| 5,235,925 A | | 8/1993 | Farrier | |
| 5,529,009 A | * | 6/1996 | Faury et al. .................. | 116/61 |
| 5,653,189 A | | 8/1997 | Payne | |

FOREIGN PATENT DOCUMENTS

| | | | | |
|---|---|---|---|---|
| EP | 0290170 A2 | | 11/1988 | |
| EP | 648668 | * | 10/1993 | |
| WO | WO 91/08944 | * | 6/1991 | ................. 114/274 |
| WO | WO 93/12970 | * | 7/1993 | ................. 114/274 |
| WO | WO 97/31816 A1 | | 9/1997 | |

* cited by examiner

Primary Examiner—Ed Swinehart
(74) Attorney, Agent, or Firm—Edwin D. Schindler (57) ABSTRACT

A trimaran vessel having a central hull (10) and two outer hulls (11) each small and of less draft compared to the central hull (10), the arrangement of the vessel being such that the draft of the vessel lessens when moving at speed due to dynamic lift developed by the movement and whereby because of the change in draft, the outer hulls (11) have little if any effect on buoyancy of the vessel when moving at speed. The increase in lift can be achieved by the use of foils (20) and/or other lifting surfaces and/or by the use of a planning hull design of at least the central hull (10). The vessel is particularly suitable for a load carrying vessel such as a ferry.

38 Claims, 10 Drawing Sheets

FIGURE 2

FIGURE 7 PROFILE FOIL ARRANGEMENT

FIGURE 8 ROTATING LIFTING FOIL

FIGURE 9 TRAILING EDGE FLAP

FIGURE 10 ROTATING FOIL & STRUT

FIGURE 11

FIGURE 12 PLAN VIEW STATIC WATERLINE SECTION SIDE HULLS

FIGURE 13 PROFILE VERTICAL STEPS

FIGURE 14 PROFILE RAKED AFT STEPS

FIGURE 15 PROFILE RAKED FORWARD STEPS

FIGURE 17 SECTION 17-17

FIGURE 16

MARINE VESSEL FOR PASSENGERS, VEHICULAR TRAFFIC OR FREIGHT

This invention relates to a trimaran construction and, in particular, to a construction which is adapted to be used in large sized vessels but which is not restricted to these. Some large sized vessels to which the invention is applicable are those which are used for vehicular and other freight and passenger ferries. In this specification, we shall refer to ferries but it is to be understood that this is purely exemplary.

Historically, ferries were mono-hull vessels and whilst these were satisfactory as far as stability and power usage was concerned, they suffered from the disadvantage of having a restricted beam, and thus carrying capacity.

More recently many ferries have been of a catamaran construction which provide good transverse stability, enhanced carrying capacity because of the spacing between the two hulls with a large portion of the load being carried between the hulls and limited drag because the two hulls can be made relatively narrow.

However, whilst having good transverse stability, catamarans are very 'stiff' which can be uncomfortable in beam seas. Also the ride control, which is often fitted to such vehicles has to produce large forces to reduce the motions.

The object of the present invention is to provide a trimaran construction which has benefits over both mono-hulls and catamarans.

The invention in its broadest sense comprises a trimaran vessel having a central hull and two outer hulls each small and of less draft compared to the central hull, the arrangement of the vessel being such that the draft of the vessel lessens when the vessel is moving at speed due to dynamic lift developed by the movement and whereby because of the change in draft the outer hulls have little if any effect on buoyancy of the vessel when moving at speed.

In this specification, the term 'moving at speed' indicates that the vessel is being driven at a speed sufficient to develop the lift which is required to satisfy the characteristics required by the invention.

It is preferred that the vessel has at least one lifting surface which provides the necessary lift to lessen the draft when the vessel is moving at speed.

The arrangement may be that when the vessel is moving at speed, the hydrodynamic lift provided by the lifting surface(s) is equivalent to the loss of buoyancy provided by the central and the outer hulls.

It may be preferred that there is provided at least one foil or the like to provide the lifting surface.

Alternatively, the lifting surface may be provided by making the central hull, at least, a planing hull.

In practice, the outer hulls are small relative to the central hull and provide, at rest only a small portion of the total buoyancy of the vessel.

In a preferred aspect of the invention the side hulls have stepped profiles which assist in further reducing drag.

In order that the invention may be more readily understood we shall describe, in relation to the accompanying drawings, a particular form of trimaran made in accordance with the invention.

In order that the invention can be placed somewhat in context, hydrodynamic theory, computer modeling and tank testing all confirm that at speed a long slender mono-hull provides the lowest overall resistance in a vessel from wind, hull surface friction and wave making but such a construction is not practical when a substantial load is to be carried.

Catamarans have made use of this concept by having a pair of spaced slender hulls which are interconnected and the load is located between the transverse extremities of the two hulls.

This provides a resistance less than a mono-hull, which would carry the same load as the catamaran. However, whilst reducing resistance, which reduces the operating costs or provides a faster vessel, some aspects of their sea keeping performance, particularly their stiffness in beam seas, is not as satisfactory as conventional mono-hulls.

However, such vessels have obtained a substantial market acceptance.

It is a proposal of the invention to provide a trimaran vessel which is at least as satisfactory or better than a catamaran, as far as resistance and load capacity are concerned, and which has enhanced seagoing capabilities.

Figure 1:
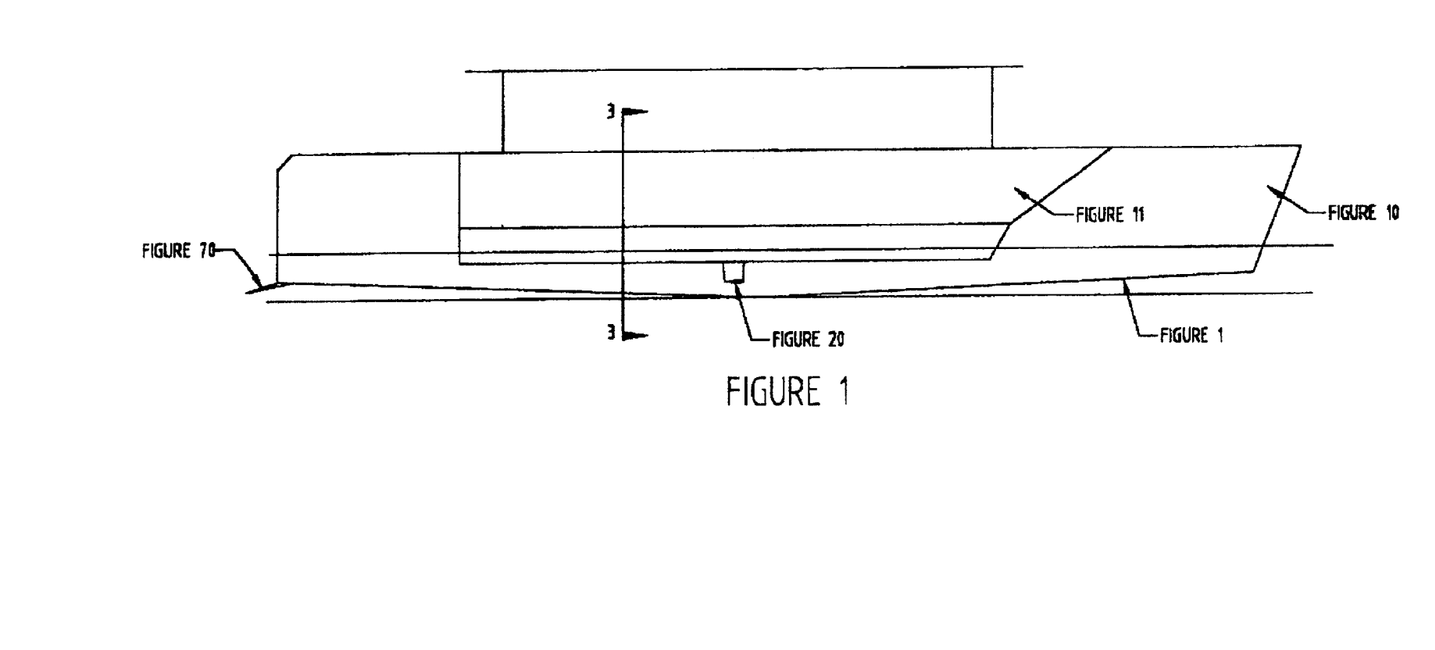
FIG. 1 is a schematic profile of the trimaran of the invention.
Figure 2:
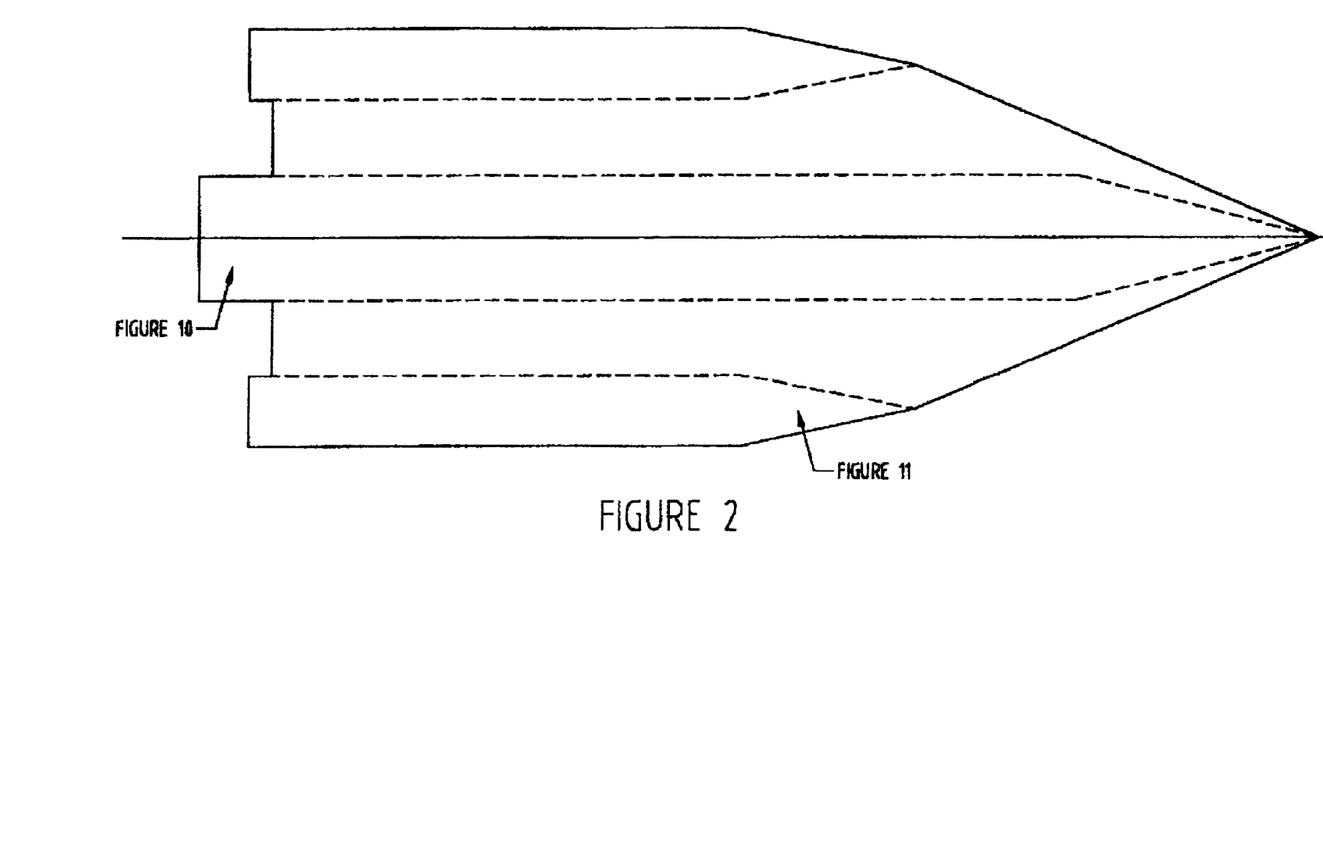
FIG. 2 is a deck plan of the trimaran with the outer hulls shown in dotted lines.
Figure 3:
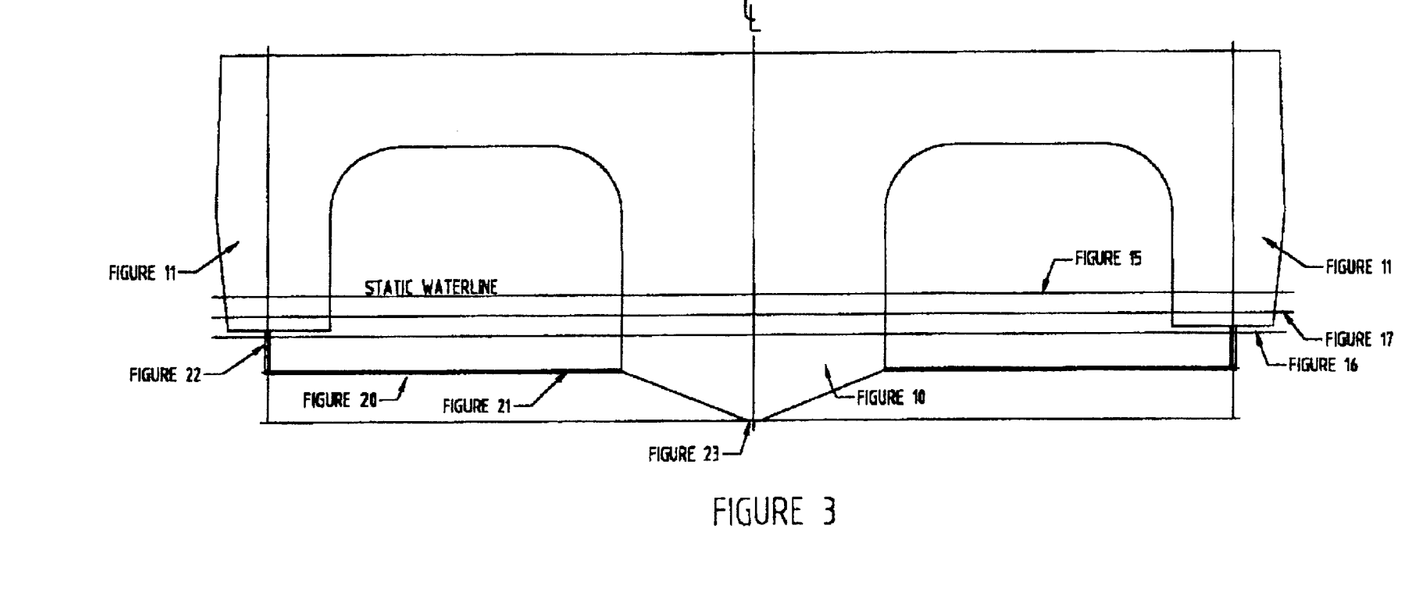
FIG. 3 is a cross section along line 3—3 of FIG. 1, looking in the direction of the arrows.

The vessel schematically illustrated in FIGS. 1 and 2 is purely exemplary but it can be seen, particularly from FIG. 2, that there is a central hull 10 which has a substantial length and this can be relatively narrow, as can be seen from the mid-ship cross section of FIG. 3, and a pair of outer hulls 11 which are short relative to the central hull and are spaced outwardly therefrom.

The central hull 10, whilst relatively narrow, is still substantially wider than the outer hulls and also extends into the water a depth somewhat greater than the two outer hulls. This can be seen from FIG. 3 which includes the static waterline 15.

It is necessary for the central hull 10 to be of at least a minimum predetermined draft so as to prove sufficient draft for propulsion units, which could be screws or water-jet propulsion, as are the conventional forms of propulsion for high speed vessels and may also be used to propel the trimaran of the invention.

This means that in a rest situation, being the position of the static waterline 15 all three hulls are in the water so there is lateral stability of the whole vessel. However, a great percentage of the buoyancy is achieved from the central hull.

The relative sizes of the hulls is adopted to give a desired level of transverse stability so the vessel is not too stiff nor too tender. The balance between the relative size of the centre hull to the outer hulls and the relative positions of their centres of buoyancy and centres of flotation, together with the separation between the hulls gives the required levels of sea-keeping and low resistance.

Near the longitudinal centre of flotation, or positioned in more than one location but providing lift centered on this region, illustrated in FIGS. 1 and 3, we provide lifting surfaces or foils 20 which may extend between the central hull 10 and the outer hulls 11.

Each foil may be faired into the lower portion of the central hull 10, their bodies 21 are substantially horizontal and may be connected to the outer hulls by struts 22. The arrangement is such that both the bodies 21 and the struts 22 are effectively hydrodynamic so that the bodies can give lift and the struts can cause as little drag as possible. Because of the arrangement no part of the foils 20 extend below the lowest part 23 of the central hull so that the draft of the vessel is not increased.

Figures 4, 5:
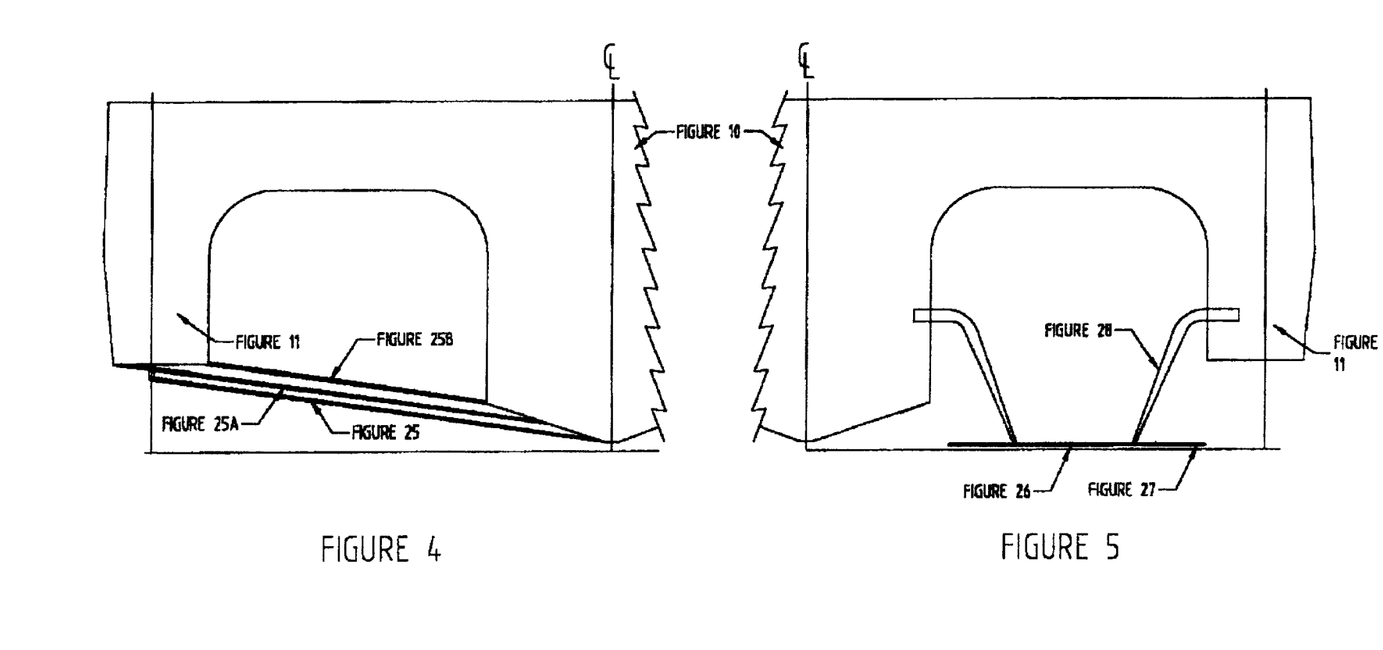
FIG. 4 shows a partial cross section similar to that of FIG. 3 and showing three different orientation of foils which can be used with the invention.
FIG. 5 shows a partial cross section similar to FIG. 3 showing a different orientation of foil.

FIG. 4 shows three alternative forms of foil 25, 25A and 25B. The foil 25 is directly connected to the central hull and the outer hull by way of a strut 25 and the foil thus has a dihedral. The foil 25A is directly connected to the outer side of the outer hull and the central hull and the foil 25B is connected between the inner edge of the outer hull and the central hull.

FIG. 5 shows a foil 26 which is not directly connected to the hulls but the body 27 is connected to struts 28 which are connected to each of the central hull and the associated outer hull.

Figure 6:
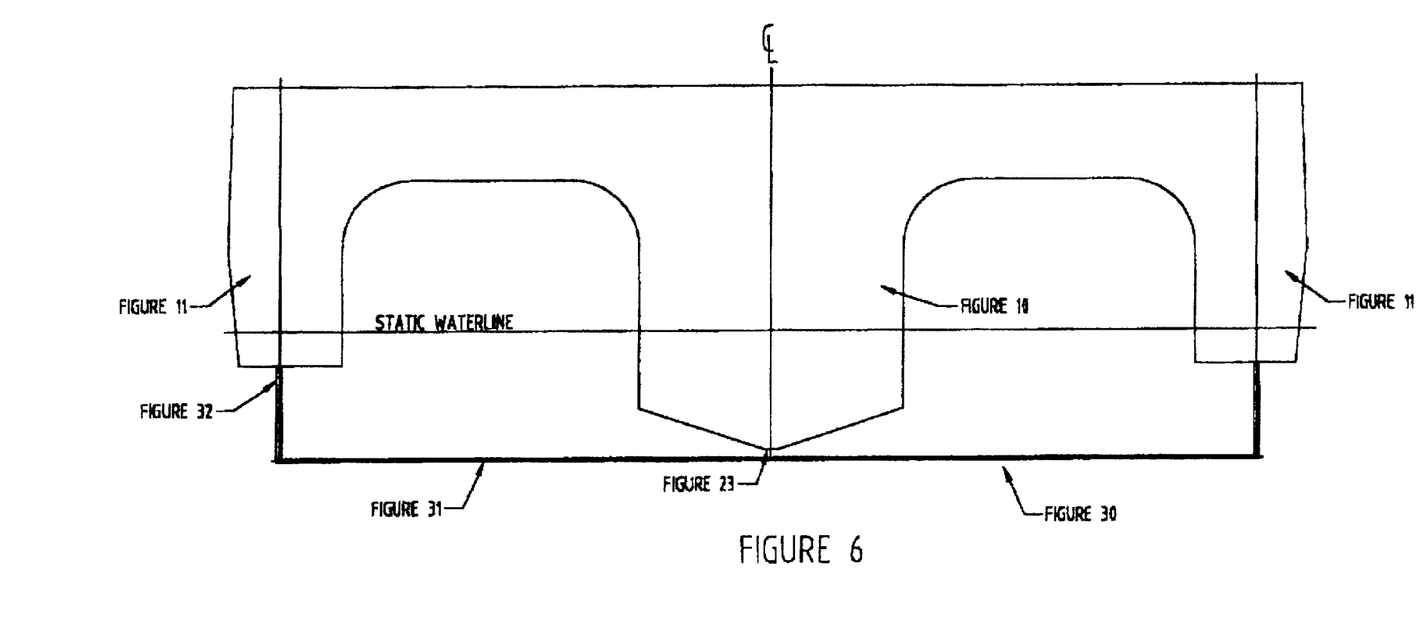
FIG. 6 is a cross section similar to that of FIG. 3 showing a single foil extending across the width of the vessel.

FIG. 6 shows a form of the invention which uses a single foil 30 which extends between the outer hulls and is connected thereto by means of struts 32. In this case, the foil body 31 may be connected to the lower portion 23 of the central hull 10 or may be spaced therefrom. As mentioned above, it is desirable in most applications that the foil extends if at all, only a slight distance below the lowest portion of the hull as any such extension causes the draft of the vessel to increase. There are, however, applications, for example when the trimaran is only being used in deep water that this may not be a disadvantage.

Figure 7:
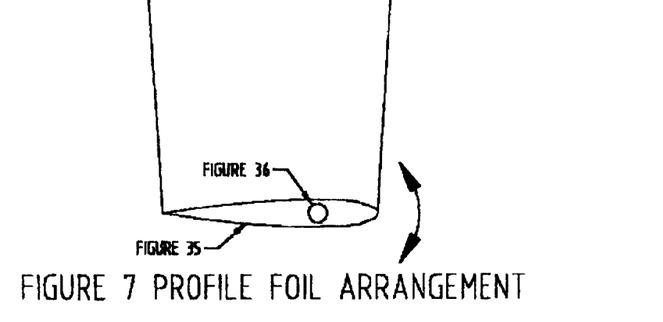
FIG. 7 shows a profile of one form of foil arrangement.

FIGS. 7 to 10 show arrangements whereby the angle of attack of the foil and thus the amount of lift, can be varied. In FIG. 7, the foil 35, which can be seen to be of hydrofoil shape is mounted about a pivot 36 so it can he rotated to give various degrees of lift or, if necessary, even a positive down force.

Figure 8:
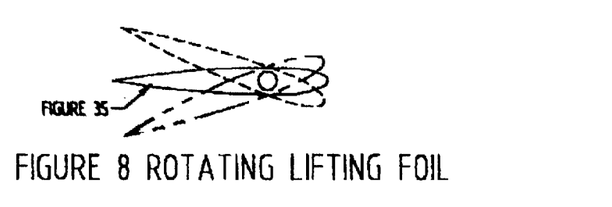
FIG. 8 shows the rotation of the foil of FIG. 7.
Figure 9:
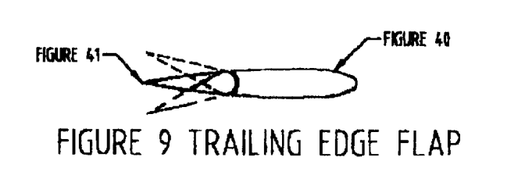
FIG. 9 shows a profile similar to that of FIG. 8 using a trailing edge flap.

The possible arrangements are shown in FIG. 8. In FIG. 9 there is shown a foil 40 which has a trailing edge flap 41 which is pivotally mounted which again can be used to modify the degree of lift provided by the foil.

Figure 10:
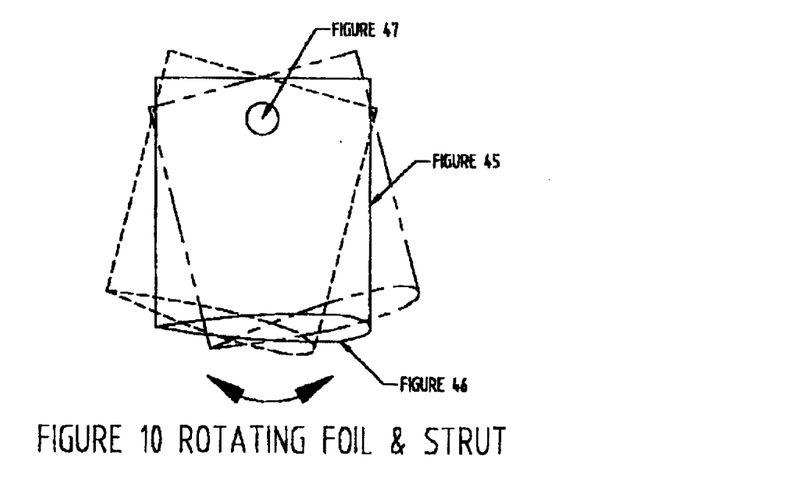
FIG. 10 shows a rotating foil and strut.

In FIG. 10 we show an arrangement where the struts 45 which carry the foil 46 are mounted about a pivot 47 so that the strut and foil can be rotate as an assembly to vary the angle of attack of the foil.

It is also possible to provide lifting surfaces such as trim tabs for adjustment of the overall trim of the vessel to compensate for asymmetric loads or constant side ways pressure on the vessel. Also, if required, the lifting surfaces, foils and/or trim tabs can be automatically operated to reduce adverse motion in seaway.

This will particularly be the case where there are separate foils on either side of the vessel and different forces can be applied to the sides by having the foils, flaps or tabs in different orientations.

In each case, the foils provide lift, reducing hull wetted surface area and drag. The foil lift component is provided by a combination of the hydrodynamic shape of the foil and the angle of attack at which it is mounted.

The angle of attack is optimised according to the speed of movement, scale, weight distribution and other characteristics of the vessel.

Dynamic stability is improved as the foils broaden the base from which lift and buoyancy are provided even thought the side hulls provide limited direct buoyancy when the boat is in motion.

Figure 11:
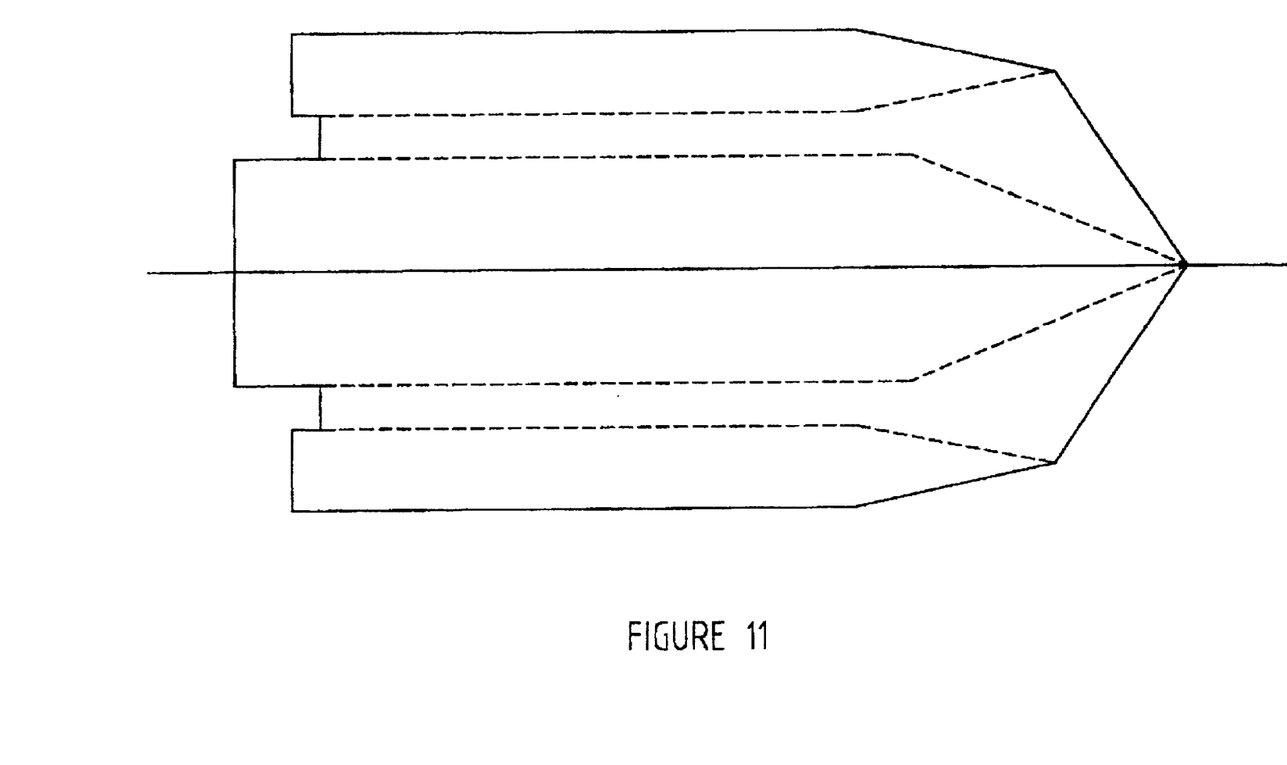
FIG. 11 shows a view in which there is use of a planing hull to give the required lift.

FIG. 11 shows an arrangement where the lifting surface is formed by the use of a planing hull as the central hull. In this arrangement, as the speed of the vessel increases, the central hull comes onto a plane and this lessens the draft of the vessel lifting the outer hulls to a position where the dynamic water line of the vessel can be considered to be the same as that shown in FIG. 3, that is so that either the outer hulls are in the water, but only by a small amount, or are out of the water. That is, the main feature of the invention may be provided without the use of foils but by the use of a known hull formation.

If the outer hulls are to be in the water when the vessel is moving at speed, they themselves may be planing hulls.

It would also be possible to provide a vessel which has a planing hull and also makes use of one or more foils and/or other lifting surfaces.

FIGS. 12 to 15 show the provision of a step profile on the outer hulls.

Figure 12:
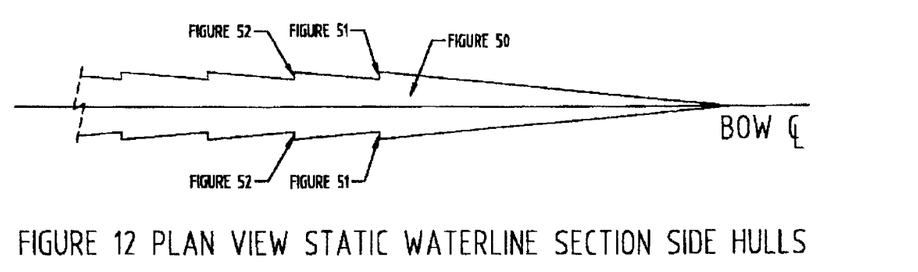
FIG. 12 is a plan view of the static waterline section of an outer side hull.

FIG. 12 is a plan view of the hull 50 and can be seen to have steps 51, 52 and so on, in its length.

Figure 13:
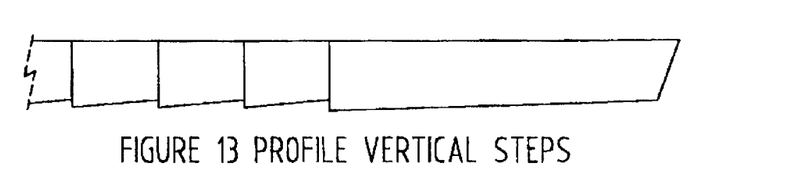
FIGS. 13 to 15 show various type of stepped hulls having a plan view as shown in FIG. 11.
Figure 14:
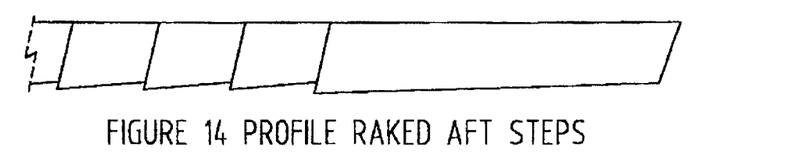
Figure 15:
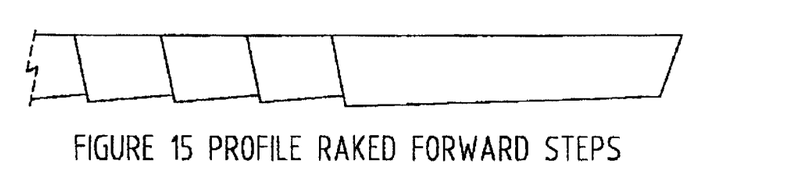

The actual form of the steps can vary depending upon results required and variations are shown in FIGS. 13 to 15. In FIG. 13 the steps are vertical. In FIG. 14 they are raked aft and in FIG. 15 they are raked forward.

By providing shapes such as this as the side hulls are travelling close to the water surface, air is entrapped reducing the effective wetted surface and thereby reducing frictional resistance.

Figure 16:
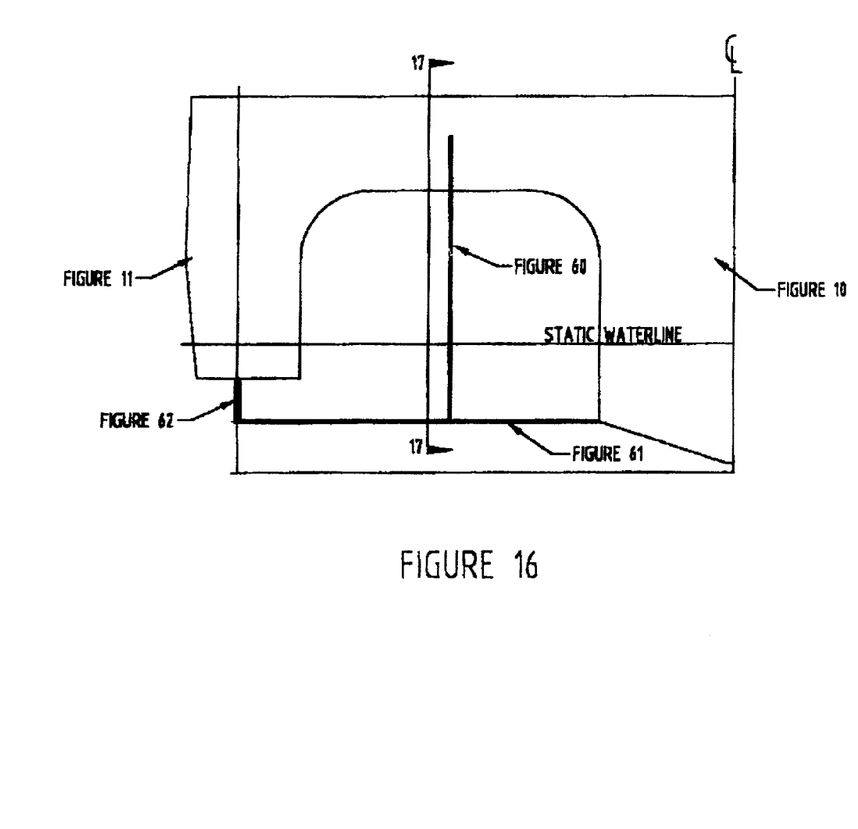
FIG. 16 is a view similar to those of FIGS. 4 and 5 showing a further form of foil.

The arrangement shown in FIG. 16, the foil 61 is connected to one or more supports 60 which is at its upper end located in the deck area between the central and adjacent outer hull.

The foil may be supported by struts 62 and may be connected to the central hull.

Figure 17:
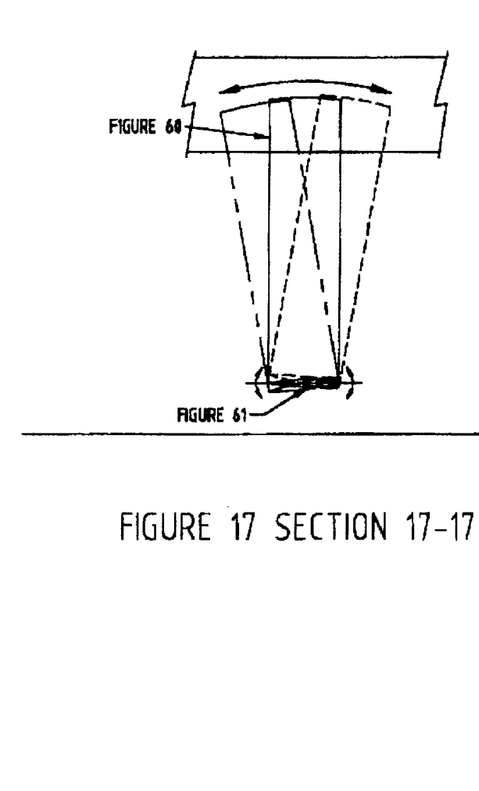
FIG. 17 is a section along line 17—17 of FIG. 16, looking in the direction of the arrows.

The support 60 may be adapted to be moved, as can be seen from FIG. 17, to thereby vary the angle of attack of the foil.

Figure 18:
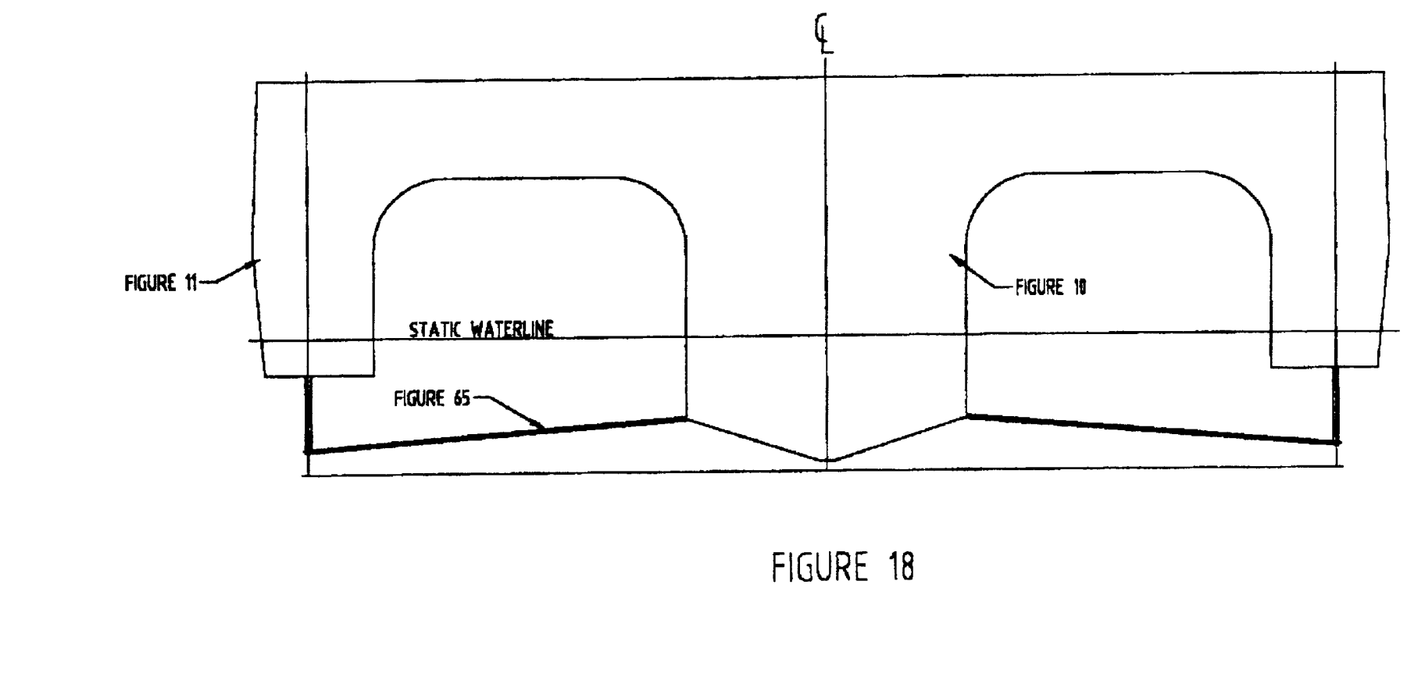
FIG. 18 is a cross section similar to that of FIG. 3 wherein the foils are shown as being anhedral.

FIG. 18 shows the foils 65 as being anhedral which may be a preferment under certain conditions.

The side hulls, although not so illustrated, may have a stepped profile and transverse section and, in operation, this reduces drag, as the effective wetted surface is reduced.

As mentioned earlier, the side hulls have a relatively low draft and this makes the operation of a stepped hull particularly effective.

When the trimaran is moving at speed the foils tend to give the vessel a degree of lift at the longitudinal centre of flotation and the construction of the main hull and the two outer hulls is such that at the speed at which the vessel travels, the vessel lifts both because of the construction of the centre hull, aided by the lift provided by the lifting surfaces, and by the stepped construction of the outer hulls and, as mentioned at the same time, air is entrained in the water passing beneath the outer hulls to reduce resistance thereon.

By the combination of these various aspects the actual volume displacement and surface area drag of the hulls at speed is minimised.

When moving at speed, the central hull can be at one of the positions 16, 17 shown as possible dynamic waterlines in FIG. 3. In each of these, the central hull shows a shallower draft than that of the static waterline shown in the figure. As can be seen, if the dynamic waterline is at 17, the two outer hulls can be effectively in the water by only a relatively small draft and if at 16, they are out of the water. Depending on the various parameters adopted, the dynamic waterline can be between, or varied from, these positions.

The lift generated by the lifting surfaces (foils, trim tabs and hulls) is designed so that when the vessel is moving at speed, to lift the side hulls, but not the main hull, clear or close to clear of the water surface. This is done by matching the lift on the foils, the trim tab(s) and the hull, with the buoyancy in the side hulls and the main hull at rest with that in the main hull and the remaining minor part of the side hulls at the running draft. See FIG. 3.

The lift from the foils is as follows:

$$\text{Lift} = \tfrac{1}{2}\rho V^2 A C_L \qquad (1)$$

Where:

$\rho$ is the water density;

V is the vessel speed;

A is the total foil area; and $C_L$ is the lift coefficient of the foil.

If more than one foil, or pair of foils (port and starboard as defined earlier), is fitted the total lift is obtained by summing equation (1) for each foil. This then, must equal the difference in buoyancy between the vessel at rest and at the required running trim.

In FIG. 1 we show an additional lifting surface 70 located at the stem of the vessel. If such an arrangement is used, then the lift is calculated from the lift of both the main foil 20, and the additional lifting surface 70.

Whilst in this specification we have discussed various form of lifting surfaces and specifically various types of foils. It is to be stressed that these are exemplary and other known types of foils, such as vented foils in which air is pumped through one or both surfaces of the foil or super-cavitating foils could be used to provide lift.

The centre of effort of the upward force generated by the lifting surfaces must be close to the centre of lost buoyancy of the vessel when raised to the dynamic waterline shown in FIG. 3. This means it has to be close to the longitudinal centre of floatation of the vessel at rest.

A preferment is that the lifting surfaces are so located that the longitudinal centre of the upward force from the lifting surfaces is within 10% LBP of the longitudinal centre of flotation of the vessel when at rest. Preferably, when there is more than one lifting surface, the main lifting surface should be located close to the longitudinal centre of flotation.

Additional transverse stability is gained at speed to compensate for the loss of transverse stability due to the hulls leaving the water as the lift of the foils reduces as they approach the water surface. In addition, stability at speed is assisted by the side hulls re-entering the water if the vessel heels.

This overall reduces the friction to be overcome by the vessel and at the same time, as mentioned above, the friction on the outer hulls is also minimised.

This also minimises the wash produced by the vessel and this can permit operation in certain restricted areas under conditions which would not otherwise be possible.

The arrangement of the invention means that an engine or engines of a particular power can drive the vessel faster than a corresponding catamaran or other high speed vessel or, alternatively, engines of lesser power can be used to drive the trimaran at the same speeds as such vessels. Overall therefore, the cost of operation can be minimised and the trimaran of the invention is practically and commercially more effective than other vessels having the same load capacity.

We claim:

1. A marine vessel for passengers, vehicular traffic or freight, comprising:

a central hull providing a majority of buoyancy of said marine vessel;

a first outer hull located leftward of said central hull and being of smaller size and of less draft relative to said central hull;

a second outer hull located rightward of said central hull and being of smaller size and of less draft relative to said central hull; and, lifting means for lessening draft on movement of said marine vessel, said lifting means including at least one foil extending between, and connected to, said first outer hull and said central hull and at least one foil extending between, and connected to, said second outer hull and said central hull, and with no part of any said foil for either said first outer hull or said second outer hull extending below a lowest point of said central hull.

2. The marine vessel for passengers, vehicular traffic or freight according to claim 1, wherein, when said marine vessel is moving at speed, a hydrodynamic lift is provided by said lifting means that is equivalent to a loss of buoyancy provided by said central hull and said first outer hull and said second outer hull.

3. The marine vessel for passengers, vehicular traffic or freight according to claim 1, wherein said central hull is a planning hull.

4. The marine vessel for passengers, vehicular traffic or freight according to claim 3, wherein said first outer hull and said second outer hull are planning hulls.

5. The marine vessel for passengers, vehicular traffic or freight according to claim 1, wherein said at least one foil of said first outer hull and said at least one foil of said second outer hull are connected to said marine vessel by struts.

6. The marine vessel for passengers, vehicular traffic or freight according to claim 1, further comprising means for varying an angle of attack for said at least one foil of said first outer hull and for said at least one foil of said second outer hull.

7. The marine vessel for passengers, vehicular traffic or freight according to claim 1, further comprising means for partially rotating said at least one foil of said first outer hull and for said at least one foil of said second outer hull about a longitudinal axis.

8. The marine vessel for passengers, vehicular traffic or freight according to claim 1, wherein said at least one foil of said first outer hull and said at least one foil of said second outer hull each include a trailing edge flap capable of being partially rotated.

9. The marine vessel for passengers, vehicular traffic or freight according to claim 1, wherein said at least one foil of said first outer hull and said at least one foil of said second outer hull are connected to said marine vessel via struts, with said at least one foil of said first outer hull, said at least one foil of said second outer hull and said struts being capable of being partially rotated about a transverse axis.

10. The marine vessel for passengers, vehicular traffic or freight according to claim 1, further comprising means for adjusting said at least one foil of said first outer hull and said at least one foil of said second outer hull depending upon external conditions of the medium through which said marine vessel is moving.

11. The marine vessel for passengers, vehicular traffic or freight according to claim 1, wherein said at least one foil of said first outer hull and said at least one foil of said second outer hull are dihedral.

12. The marine vessel for passengers, vehicular traffic or freight according to claim 1, wherein said at least one foil of said first outer hull and said at least one foil of said second outer hull are anhedral.

13. The marine vessel for passengers, vehicular traffic or freight according to claim 1, wherein said lifting means further includes a lifting surface located so that a longitudinal center of an upward force from said lifting surface is within 10% LBP of a longitudinal center of flotation of said marine vessel when at rest.

14. The marine vessel for passengers, vehicular traffic or freight according to claim 1, wherein, when said marine vessel is moving at speed, said first outer hull and said second outer hull are above the surface of the water through which said marine vessel is moving.

15. The marine vessel for passengers, vehicular traffic or freight according to claim 1, wherein said first outer hull and said second outer hull are stepped for providing improved hydrodynamic properties when said marine vessel is moving.

16. The marine vessel for passengers, vehicular traffic or freight according to claim 15, wherein said steps are vertical steps.

17. The marine vessel for passengers, vehicular traffic or freight according to claim 15, wherein said steps are raked aft.

18. The marine vessel for passengers, vehicular traffic or freight according to claim 15, wherein said steps are raked forward.

19. The marine vessel for passengers, vehicular traffic or freight according to claim 15, wherein said steps are stepped both in plan and in elevation.

20. A marine vessel for passengers, vehicular traffic or freight, comprising:

a central hull providing a majority of buoyancy of said marine vessel;

a first outer hull located leftward of said central hull and being of smaller size and of less draft relative to said central hull;

a second outer hull located rightward of said central hull and being of smaller size and of less draft relative to said central hull; and, lifting means for lessening draft on movement of said marine vessel, said lifting means including a single foil extending width-wise across said marine vessel and connected to each of said first outer hull and said second outer hull.

21. The marine vessel for passengers, vehicular traffic or freight according to claim 20, wherein, when said marine vessel is moving at speed, a hydrodynamic lift is provided by said lifting means that is equivalent to a loss of buoyancy provided by said central hull and said first outer hull and said second outer hull.

22. The marine vessel for passengers, vehicular traffic or freight according to claim 20, wherein said central hull is a planning hull.

23. The marine vessel for passengers, vehicular traffic or freight according to claim 20, wherein said first outer hull and said second outer hull are planning hulls.

24. The marine vessel for passengers, vehicular traffic or freight according to claim 1, further comprising means for varying an angle of attack for said single foil of said lifting means.

25. The marine vessel for passengers, vehicular traffic or freight according to claim 1, further comprising means for partially rotating said single foil about a longitudinal axis.

26. The marine vessel for passengers, vehicular traffic or freight according to claim 20, wherein said single foil includes a trailing edge flap capable of being partially rotated.

27. The marine vessel for passengers, vehicular traffic or freight according to claim 20, wherein said single foil of said lifting means is connected to said marine vessel via struts, with said single foil and said struts being capable of being partially rotated about a transverse axis.

28. The marine vessel for passengers, vehicular traffic or freight according to claim 20, further comprising means for adjusting said single foil of said lifting means depending upon external conditions of the medium through which said marine vessel is moving.

29. The marine vessel for passengers, vehicular traffic or freight according to claim 20, wherein said single foil is dihedral.

30. The marine vessel for passengers, vehicular traffic or freight according to claim 20, wherein said single foil is anhedral.

31. The marine vessel for passengers, vehicular traffic or freight according to claim 20, wherein said lifting means further includes a lifting surface located so that a longitudinal center of an upward force from said lifting surface is within 10% LBP of a longitudinal center of flotation of said marine vessel when at rest.

32. The marine vessel for passengers, vehicular traffic or freight according to claim 20, wherein, when said marine vessel is moving at speed, said first outer hull and said second outer hull are above the surface of the water through which said marine vessel is moving.

33. The marine vessel for passengers, vehicular traffic or freight according to claim 20, wherein said first outer hull and said second outer hull are stepped for providing improved hydrodynamic properties when said marine vessel is moving.

34. The marine vessel for passengers, vehicular traffic or freight according to claim 33, wherein said steps are vertical steps.

35. The marine vessel for passengers, vehicular traffic or freight according to claim 33, wherein said steps are raked aft.

36. The marine vessel for passengers, vehicular traffic or freight according to claim 33, wherein said steps are raked forward.

37. The marine vessel for passengers, vehicular traffic or freight according to claim 33, wherein said steps are stepped both in plan and in elevation.

38. The marine vessel for passengers, vehicular traffic or freight according to claim 20, wherein said single foil of said lifting means does not extend substantially below a bottom part of said central hull, so that said lifting means does not increase the draft of said marine vessel.

* * * * *